(12) United States Patent
Nallagatla et al.

(10) Patent No.: US 7,454,547 B1
(45) Date of Patent: Nov. 18, 2008

(54) DATA EXCHANGE BETWEEN A RUNTIME ENVIRONMENT AND A COMPUTER FIRMWARE IN A MULTI-PROCESSOR COMPUTING SYSTEM

(75) Inventors: Purandhar Nallagatla, Duluth, GA (US); Harikrishna Doppalapudi, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 163 days.

(21) Appl. No.: 11/435,152

(22) Filed: May 16, 2006

(51) Int. Cl.
*G06F 9/44* (2006.01)
*G06F 13/24* (2006.01)
*G06F 15/00* (2006.01)

(52) U.S. Cl. .................. 710/260; 717/168; 710/267; 726/27; 712/31

(58) Field of Classification Search .................. None
See application file for complete search history.

(56) References Cited

U.S. PATENT DOCUMENTS

| | | | | |
|---|---|---|---|---|
| 5,819,100 | A * | 10/1998 | Pearce | 713/323 |
| 6,122,732 | A * | 9/2000 | Ahuja | 713/1 |
| 6,272,618 | B1 * | 8/2001 | Tyner et al. | 712/31 |
| 6,282,601 | B1 * | 8/2001 | Goodman et al. | 710/260 |
| 6,711,642 | B2 * | 3/2004 | Huang | 710/260 |
| 6,745,296 | B2 * | 6/2004 | Chong | 711/138 |
| 7,136,994 | B2 * | 11/2006 | Zimmer et al. | 713/2 |
| 7,200,701 | B2 * | 4/2007 | Stultz | 710/267 |
| 7,216,189 | B2 * | 5/2007 | Berlin | 710/260 |
| 7,222,062 | B2 * | 5/2007 | Goud et al. | 703/23 |
| 7,222,339 | B2 * | 5/2007 | Rothman et al. | 717/168 |
| 7,260,848 | B2 * | 8/2007 | Zimmer | 726/27 |
| 2002/0099893 | A1 * | 7/2002 | Nguyen et al. | 710/260 |
| 2005/0076107 | A1 * | 4/2005 | Goud et al. | 709/223 |
| 2005/0102447 | A1 * | 5/2005 | Stultz | 710/33 |
| 2005/0102457 | A1 * | 5/2005 | Stultz | 710/260 |
| 2005/0114578 | A1 * | 5/2005 | Lewis | 710/260 |
| 2006/0123223 | A1 * | 6/2006 | Mayfield et al. | 713/2 |

* cited by examiner

*Primary Examiner*—Paul R. Myers
*Assistant Examiner*—Brian T Misiura
(74) *Attorney, Agent, or Firm*—Hope Baldauff Hartman, LLC

(57) ABSTRACT

A method, system, apparatus, and computer-readable medium for exchanging data between an application program and a firmware in a computer system having multiple CPUs are provided. According to the method, an application program stores an input parameter for the firmware program in a register of the CPU on which it is executing. Data is also stored in a register of the CPU that identifies the CPU as having generated a SMI. The application program then generates a software SMI. In response to the SMI, a SMM dispatcher executing within the SMM causes the current contents of all the registers of the CPUs to be saved. The SMM dispatcher then identifies the CPU that generated the SMI by searching the saved register contents to locate the data stored by the application program that identifies the CPU as having generated the software SMI. Once the CPU has been identified, the input parameter can be retrieved from the saved register contents for the identified CPU.

18 Claims, 6 Drawing Sheets

US 7,454,547 B1

DATA EXCHANGE BETWEEN A RUNTIME ENVIRONMENT AND A COMPUTER FIRMWARE IN A MULTI-PROCESSOR COMPUTING SYSTEM

BACKGROUND

Computing systems often use a non-volatile memory device, such as a non-volatile random access memory ("NVRAM") device, to store the system firmware. In order to update the firmware, it has long been necessary to perform a special update procedure. For instance, in some computer systems, it is necessary to prepare a special boot disk, and to initialize the computer system from the disk in order to update the firmware. This process, however, can be complicated and time consuming, especially for users that are not familiar with the steps necessary to create and utilize a firmware update boot disk.

In view of the difficulty in creating and utilizing a firmware update boot disk, it is desirable to be able to update the firmware utilizing a traditional application program executing within a runtime environment, such as an operating system or an extensible firmware interface ("EFI") runtime environment. In order to update the NVRAM in this manner, however, it is necessary for the application program to communicate with and utilize the services of programs made available by the firmware itself.

In order to enable communication between a runtime environment application program and firmware programs, it is necessary for these programs to exchange data. One way this has been accomplished in the past is by permanently reserving certain memory areas for data exchange between the operating system and the firmware. However, permanently reserving certain memory areas for data exchange in this manner requires each program to know the location of the reserved area in advance. If it becomes necessary to relocate the reserved area, the application program and the firmware programs must be modified. Accordingly, permanently reserving a memory location for data exchange between an application program and a firmware program is a less than ideal method of data exchange. This problem is also made more difficult to overcome when the computer system has multiple processors.

It is with respect to these considerations and others that the various embodiments described below have been made.

SUMMARY

In accordance with the embodiments and implementations described herein, a method, system, apparatus, and computer-readable medium for exchanging data between an application program executing in a runtime environment and a firmware in a computer system having multiple central processing units ("CPUs" or "processors") are provided. Through the embodiments described herein, an application program executing within a runtime environment, such as an operating system or an EFI environment, can exchange data with a firmware program executing in a system management mode ("SMM") within a computer system having multiple processors.

According to one aspect, a method is provided for exchanging data between a runtime environment application program and a firmware program executing in a SMM on a computer system having two or more processors. According to the method, an application program executing on an operating system stores an input parameter for the firmware program in a register of the processor on which it is executing. The application program then generates a software SMI by writing a function identifier corresponding to the firmware program to a SMI machine port. The SMI machine port is a memory location which, when written to, causes a software SMI to be generated. The computer system hardware then causes data to be stored in a register of the processor that identifies the processor as having generated a software system management interrupt ("SMI").

In response to the generation of the SMI, a SMM dispatcher executing within the SMM causes the current contents of all the registers of the processors to be saved. The SMM dispatcher then identifies the processor that generated the SMI by searching the saved register contents to locate the data that identifies the processor as having generated the software SMI. Once the processor has been identified, the input parameter can be retrieved from the saved register contents for the identified processor.

According to other aspects of the method, the SMM dispatcher makes the input parameter available to other programs executing within the SMM by installing a table that includes data identifying the processor that generated the SMI and along with the stored register contents of all of the processors. The table is identified by a globally unique identifier ("GUID"). Another program executing within the SMM, such as an SMM handler for handling the SMI, may utilize the GUID to locate the table. The SMM handler then utilizes the table to obtain the input parameter from the saved register contents of the CPU that generated the SMI.

According to another aspect of the method, the application program comprises a program for updating the contents of a non-volatile memory device of the computer system and the SMM handler comprises a firmware program for performing a function relating to the update of the memory device. In particular, SMM handlers may be provided for obtaining information regarding the memory device, enabling the memory device, reading from the memory device, writing to the memory device, erasing a portion of the memory device, and disabling the memory device. In this regard, the input parameter may comprise a pointer to a shared memory location containing additional input parameters for the SMM handler.

The subject matter described herein may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
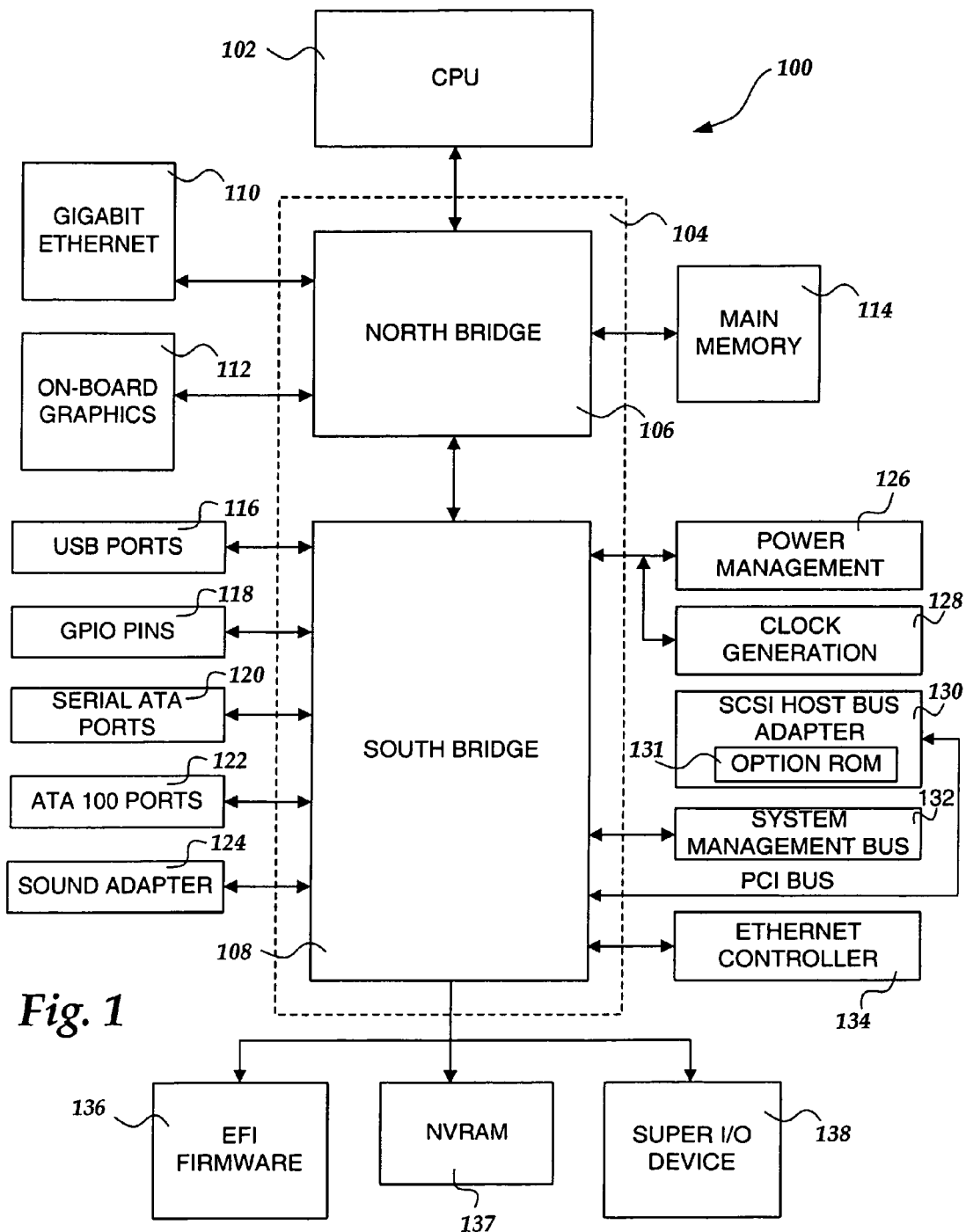
FIG. 1 is a computer architecture diagram that illustrates various components of a computer that provides an illustrative operating environment.

Methods, systems, apparatuses, and computer-readable media are provided herein for enabling data exchange between an application program executing in a runtime environment and a firmware program in a multi-processor computer system. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

FIG. 1 and the following discussion are intended to provide a brief, general description of a suitable computing environment in which the embodiments described herein may be implemented. While the technical details are presented herein in the general context of program modules that execute in conjunction with the execution of a runtime environment and a computer firmware, those skilled in the art will recognize that the embodiments may also be implemented in combination with other program modules. As described herein, the term runtime environment means any operating environment in which a program may be executed other than from within a firmware. For instance, a runtime environment may include, but is not limited to an operating system or an EFI runtime environment.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments presented herein will be described. It should be appreciated that although the embodiments described herein are discussed in the context of a conventional desktop or server computer, virtually any type of computing device may be utilized. FIG. 1 shows an illustrative computer architecture for a computer 100 that is operative to enable the exchange of data between an application program and a program executing within a computer firmware.

In order to provide the functionality described herein, the computer 100 includes a baseboard, or "motherboard", which is a printed circuit board to which a multitude of components or devices may be connected by way of a system bus or other electrical communication path. In one illustrative embodiment, a CPU 102 operates in conjunction with a chipset 104. The CPU 102 is a standard central processor that performs arithmetic and logical operations necessary for the operation of the computer. As will be described in greater detail below, the computer 100 may include a multitude of CPUs.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software, or other runtime environment, and uses computer resources to perform application specific tasks desired by the user. As will be described in greater detail below, an application is provided herein that updates the firmware 136 stored in the NVRAM 137.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a NVRAM 137 for storing the firmware 136 that includes program code containing the basic routines that help to start up the computer 100 and to transfer information between elements within the computer 100.

The EFI firmware 136 comprises a firmware that is compatible with the EFI specification. Additional details regarding the operation of the EFI firmware 136 are provided below with respect to FIGS. 2-3. The LPC interface may also be utilized to connect a NVRAM 137 to the computer 100. The NVRAM 137 may be utilized by the firmware 136 to store configuration data and other kinds of data for the computer 100. It should be appreciated that the configuration and other data for the computer 100 may be stored on the same NVRAM device as the firmware 136.

According to one implementation, the CPU 4 may comprise a general purpose microprocessor from INTEL CORPORATION. For instance, the CPU 4 may comprise a PENTIUM 4 or XEON microprocessor from INTEL CORPORATION. As known to those skilled in the art, such microprocessors support a SMM. The SMM executes code in the firmware to provide an alternative operating environment that can be used to monitor and manage various system resources for more efficient energy usage, to control system hardware, and/or to run proprietary code. The SMM computing mode was introduced by the INTEL CORPORATION in the 386SL processor. The SMM computing mode is also available in the PENTIUM 4, XEON, P6 family, PENTIUM, and INTEL 386 processors. SMM is also available in compatible microprocessors from other manufacturers.

SMM is a special-purpose operating mode for handling system-wide functions like power management, system hardware control, or proprietary OEM-designed code. It is generally intended only for use by system firmware, not by applications software or general-purpose system software. The main benefit of SMM is that it offers a distinct and easily isolated processor environment that operates transparently to the operating system or executive and software applications.

As will be described in greater detail below, when SMM is invoked through a SMI, the current state of the processor (the processor's context) is saved. The CPU 4 then switches to a separate operating environment contained in a special portion of the RAM 18 called the system management RAM ("SM-RAM"). While in SMM, the CPU 4 executes SMI handler code to handle the SMI interrupt. When the SMI handler has completed its operations, it executes a resume ("RSM") instruction. This instruction causes the saved context of the processor to be reloaded, causes the processor to switch back to executing in protected or real mode, and to resume executing the interrupted application or operating-system program or task. Additional details regarding this process will be provided below.

The execution of the SMM computing mode is transparent to applications and operating systems. This transparency is guaranteed because the only way to enter SMM is by means of an SMI, because the processor executes SMM code in a separate address space (the SMRAM) that can be made inaccessible from the other operating modes, because the processor saves the context of the interrupted program upon entering SMM, because all interrupts normally handled by the operating system are disabled upon entry into SMM, and because the RSM instruction can only be executed in SMM. Additional details regarding the operation of the SMM computing mode are provided in documentation available from INTEL CORPORATION and are well known to those skilled in the art. It should also be appreciated that the CPU 102 has other distinct execution modes, such as the real mode and the protected mode. Additional details regarding the processes executing in these modes is provided in greater detail below.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
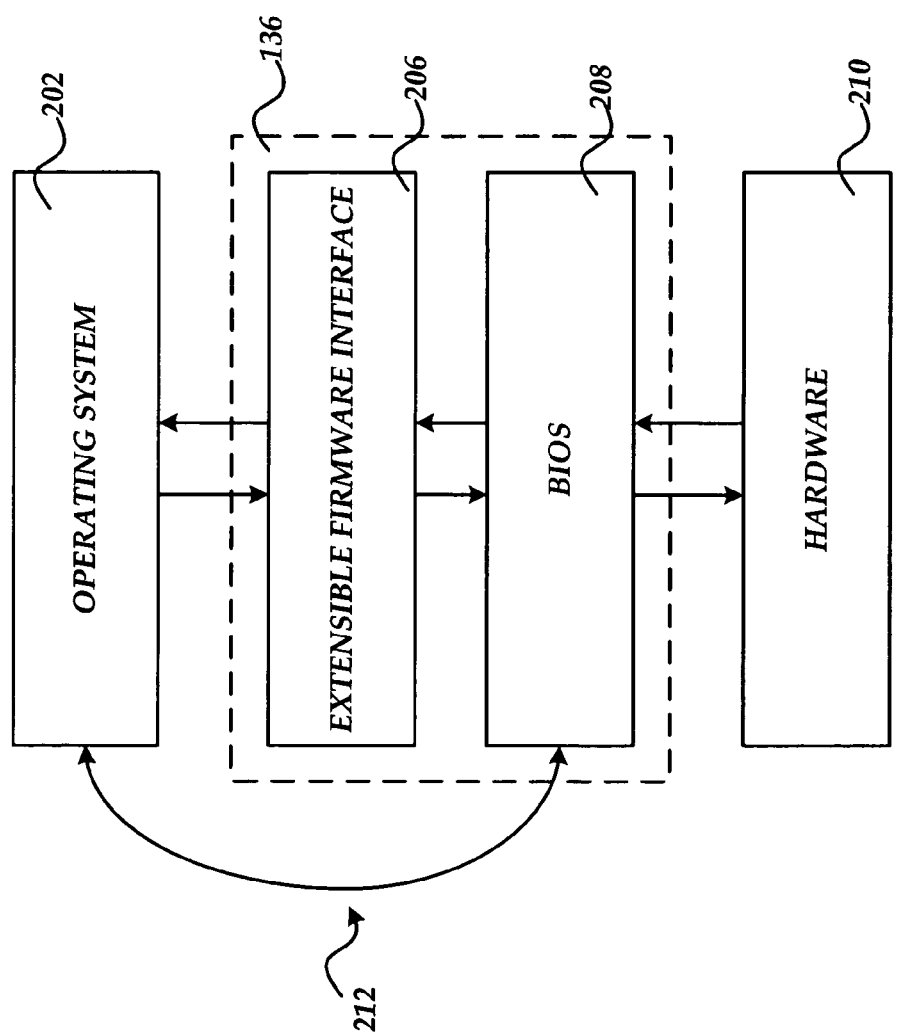
FIGS. 2 and 3 are computer architecture diagrams that illustrate aspects of an EFI environment utilized by the implementations described herein.

Referring now to FIG. 2, additional details regarding the operation of the EFI firmware 136 of the computer 100 will be described. In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The specification is called the Extensible Firmware Interface specification and is available from INTEL CORPORATION. The original EFI specification from INTEL CORPORATION is also being extended by the UNIFIED EXTENSIBLE FIRMWARE INTERFACE FORUM ("UEFI").

The EFI specification describes an interface between the operating system and the system firmware. In particular, the specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others.

As described above, the firmware 136 comprises a firmware compatible with the EFI specification from INTEL CORPORATION or from the UEFI FORUM. The EFI specification describes an interface between the operating system 202 and the system firmware 136. The EFI specification defines the interface that platform firmware must implement, and the interface that the operating system 202 may use in booting. How the firmware 136 implements the interface is left up to the manufacturer of the firmware. The intent of the specification is to define a way for the operating system 202 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 206 and a BIOS 208 may be present in the firmware 136. This allows users and system integrators to support both firmware interfaces. In order to provide this functionality, an interface 212 may be provided for use by legacy operating systems and applications. Additional details regarding the architecture and operation of the EFI 206 are provided below with respect to FIG. 3. Moreover, additional details regarding the operation and architecture of EFI can be found in the EFI specification which is available from INTEL CORPORATION end expressly incorporated herein by reference.

EFI also provides an EFI environment that executes within the SMM mode described above. The "mini-EFI" that executes within the SMM is utilized to provide EFI-like functionality for programs executing within the SMM. Programs executing within the mini-EFI in SMM may have access to the functions and data utilized by the EFI 206. Additional details regarding the mini-EFI utilized in SMM and the programs that execute within it will be provided below with respect to FIGS. 4-6.

Figure 3:
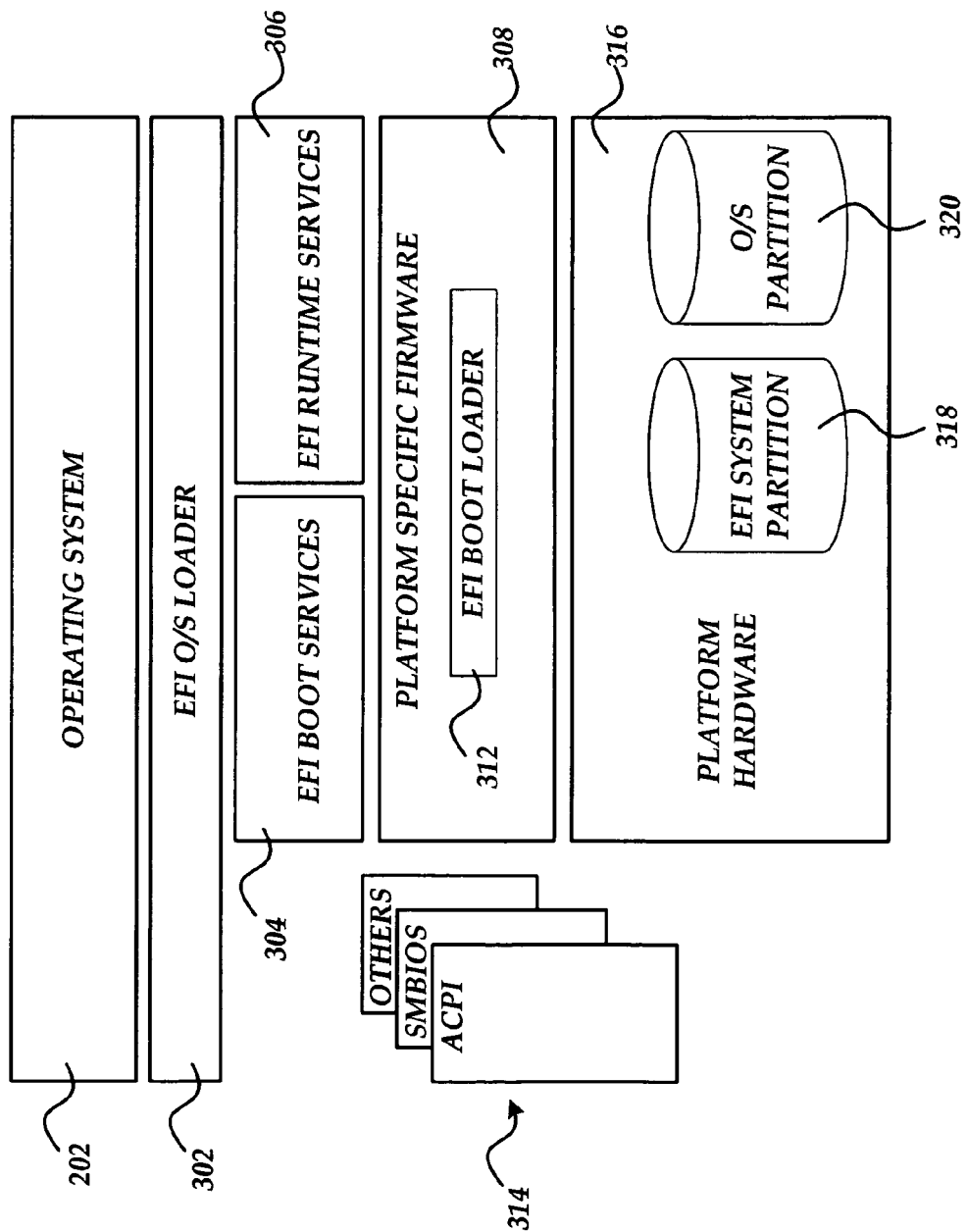

Turning now to FIG. 3, additional details regarding an EFI specification-compliant system utilized to provide an operating environment for the various implementations presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order. It should be appreciated that both the operating system 202 and the EFI firmware may provide a runtime environment for application programs as described herein.

Figure 4B:
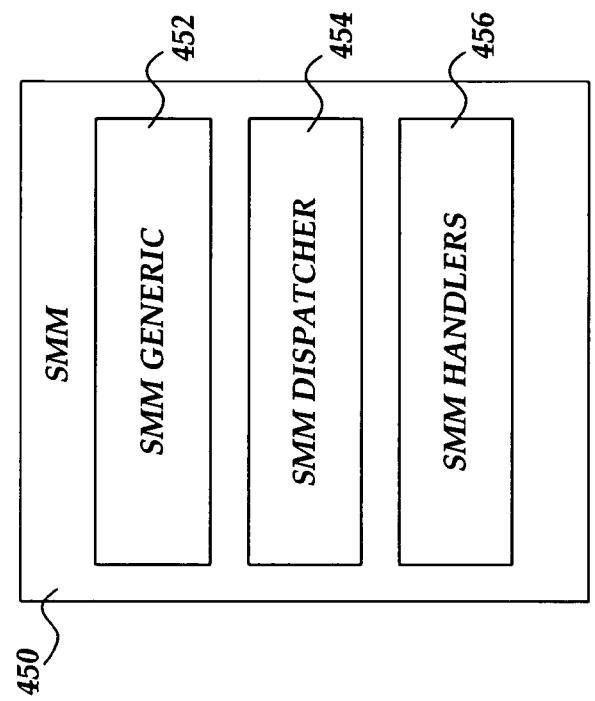
FIG. 4B is a block diagram illustrating aspects of a software architecture for providing a system management mode.
Figure 4A:
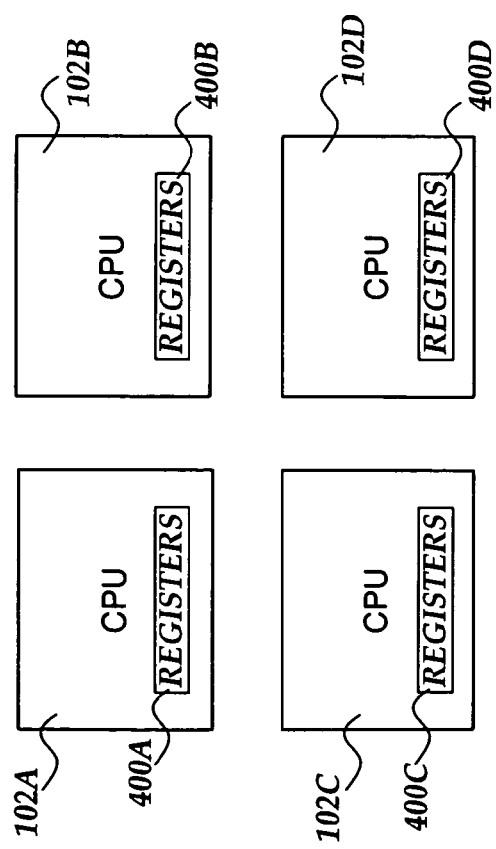
FIG. 4A is a block diagram illustrating aspects of a multi-processor computing environment that forms a portion of an illustrative operating environment.

Referring now to FIG. 4A, additional details will be provided regarding an illustrative operating environment for the implementations described herein. As discussed briefly above, the computer 100 may include a multitude of CPUs 102A-102D. Each of the CPUs 102A-102D provides central processing capabilities for the computer 100. As known to those skilled in the art, each of the CPUs 102A-102D also maintains a set of specific and general use registers 400A-400D, respectively. As will be described in greater detail below, the registers 400A-400D are utilized herein to exchange data between an application program executing in a runtime environment and a firmware program.

As also known to those skilled in the art, a program executing on one of the processors 102A-102D can generate a software SMI by writing a function identifier corresponding to a SMM handler program to a SMI machine port. The SMI machine port is a memory location which, when written to, causes a software SMI to be generated. The SMM handler is a program for handling the SMI.

When a software SMI is initiated on one of the processors 102A-102D, that processor enters the SMM and the other processors stop execution. The program on which the SMI is initiated is responsible for executing the SMM and the SMM handler. As will be described in greater detail below, however, once in the SMM it can be difficult to determine which of the processors 102A-102B generated the SMI.

Turning now to FIG. 4B, additional details regarding the SMM 450 provided by the computer 100 will be described. As shown in FIG. 4B, the SMM 450 comprises several software components including SMM generic code 452, a SMM dispatcher 454, and one or more SMM handlers 456. The SMM dispatcher 454 is responsible for handling the processing of an SMI, including identifying the appropriate SMM handler 456 for handling the generated interrupt. The SMM handlers 456 are responsible for performing the actual processing necessary to handle the interrupt. Additional details regarding the operation of the SMM dispatcher 456 and the SMM handlers 456 is provided in greater detail below with respect to FIGS. 5 and 6.

Figure 5:
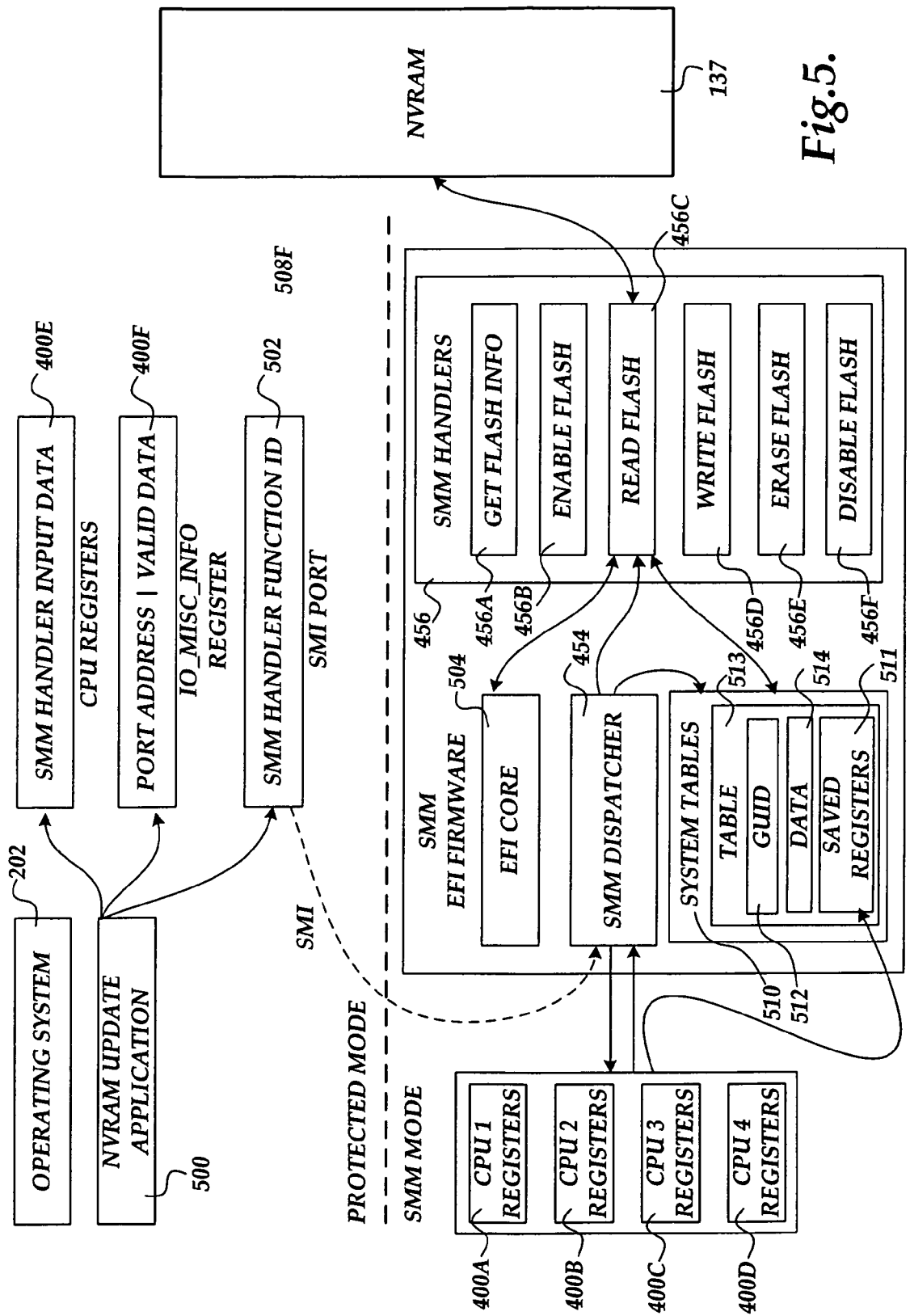
FIG. 5 is a block diagram illustrating a software architecture for exchanging data between an application program and a computer firmware.

Turning now to FIG. 5, additional details will be provided regarding an illustrative software architecture utilized to exchange data between an application program and a firmware program will be provided. As discussed briefly above, an application program 500 is provided for updating the contents of the firmware 137. It should be appreciated that the application program 500 may execute within the operating system 202, within the EFI 206, or within another type of runtime environment. It should also be appreciated that although the embodiments are presented herein in the context of an application program 500 for updating the NVRAM 137, the implementations described herein may be utilized with any type of application program 500 and any type of SMM handler 456.

In order to update the contents of the NVRAM 137, the application program 500 utilizes the services of one or more of the SMM handlers 456. In particular, a SMM handler 456A is provided for getting information about the NVRAM 137, a SMM handler 456B is provided for enabling the NVRAM 137, a SMM handler 456C is provided for reading from the NVRAM 137, a SMM handler 456D is provided for writing to the NVRAM 137, a SMM handler 456E is provided for erasing a portion of the NVRAM 137, and a SMM handler 456F is provided for disabling the NVRAM 137. It should be appreciated that FIG. 5 illustrates a process for exchanging data between the application program 500 and the SMM handler 456C for reading from the NVRAM 137. However, data may be provided by the application program 500 to the other SMM handlers 456A-456B and 456D-456F in a similar manner.

According to embodiments, the application program 500 provides an input parameter to the SMM handler 456C. The input parameter as described herein is a pointer to a location in shared memory where additional input parameters for the SMM handler 456C may be located. However, it should be appreciated that the input parameter may comprise any type of data destined for an SMM handler 456 for any purpose.

In order to provide the input parameter to the SMM handler 456C, the application program 500 places the input parameter into one of the CPU registers 400E. In particular, the input parameter is placed into an appropriate CPU register 400E of the CPU 102A-102D on which the application program is executing.

Once the input parameter has been placed in the appropriate CPU registers, the application program 500 generates a software SMI by writing a function identifier corresponding to the desired SMM handler 456A-456F to a SMI machine port 502. The SMI machine port 502 is a memory location which, when written to, causes a software SMI to be generated.

In response to the generation of the software SMI, the hardware of the computer 100 places data into a CPU register that identifies the CPU as having initiated a software SMI. In particular, according to an embodiment, a port address and a valid bit are placed into the register 400F. On INTEL and compatible CPUs, this register comprises the IO_MISC_INFO register as known to those skilled in the art. Bits 16 to 31 of the register are utilized for the port address and bit 0 is utilized for the valid bit. Bit 0 is utilized to validate the address. If bit 0 is zero, then the address in bits 16 to 31 is not valid. If bit 0 is one, then the address in bits 16 to 31 is valid.

Also in response to the generation of the software SMI, the SMM dispatcher 454 saves the state of each of the processors 102A-102D, including the contents of their respective registers 400A-400D. The SMM dispatcher 454 then searches the saved contents of the CPU registers 400A-400D for the data indicating that the CPU initiated the software SMI. By locating this data in the saved register data, the SMM dispatcher 454 can determine which of the CPUs 102A-102D generated the software SMI.

Once the input parameter has been located, the SMM dispatcher 454 makes the input parameter available to the SMM handlers 456A-456F. In particular, according to one implementation, the SMM dispatcher 454 creates a table 513 in the system table area 510 of the SMM. The table 513 includes data 514 that identifies the CPU 102 that generated the software SMI. The table 513 also includes a copy of the saved register data 511 for each of the registers 400A-400D. The table is uniquely identified by a GUID 512.

Once the table 513 has been created, the SMM dispatcher 454 calls the SMM handler identified by the SMI handler function identifier. For instance, if the SMI handler function identifier specified the SMM handler 456C, the SMM dispatcher 456C would call the SMM dispatcher handler 456C. In response, the SMM dispatcher handler 456C utilizes the GUID 512 to locate the table 513. Once the table 513 has been located, the SMM handler 456C searches the saved registers 511 to locate the contents of the registers of the CPU that generated the SMI. Once the contents have been located, the SMM handler 456C locates the input parameter from the saved contents.

Once the SMM handler 456C has the input parameter, it can perform its desired function, such as for instance reading from the NVRAM 137 or modifying the NVRAM 137. Once the SMM handler 456C has finished its processing, the SMM dispatcher 454 restores the saved state of the processors 102A-102D, including the registers 400A-400D. The application program 500 then continues executing where it left off prior to the software SMI. If should be appreciated that this process may be repeated many times in order to update the contents of the NVRAM 137 or read large areas of the NVRAM 137. Additional details regarding this process are provided below with respect to FIG. 6.

Figure 6:
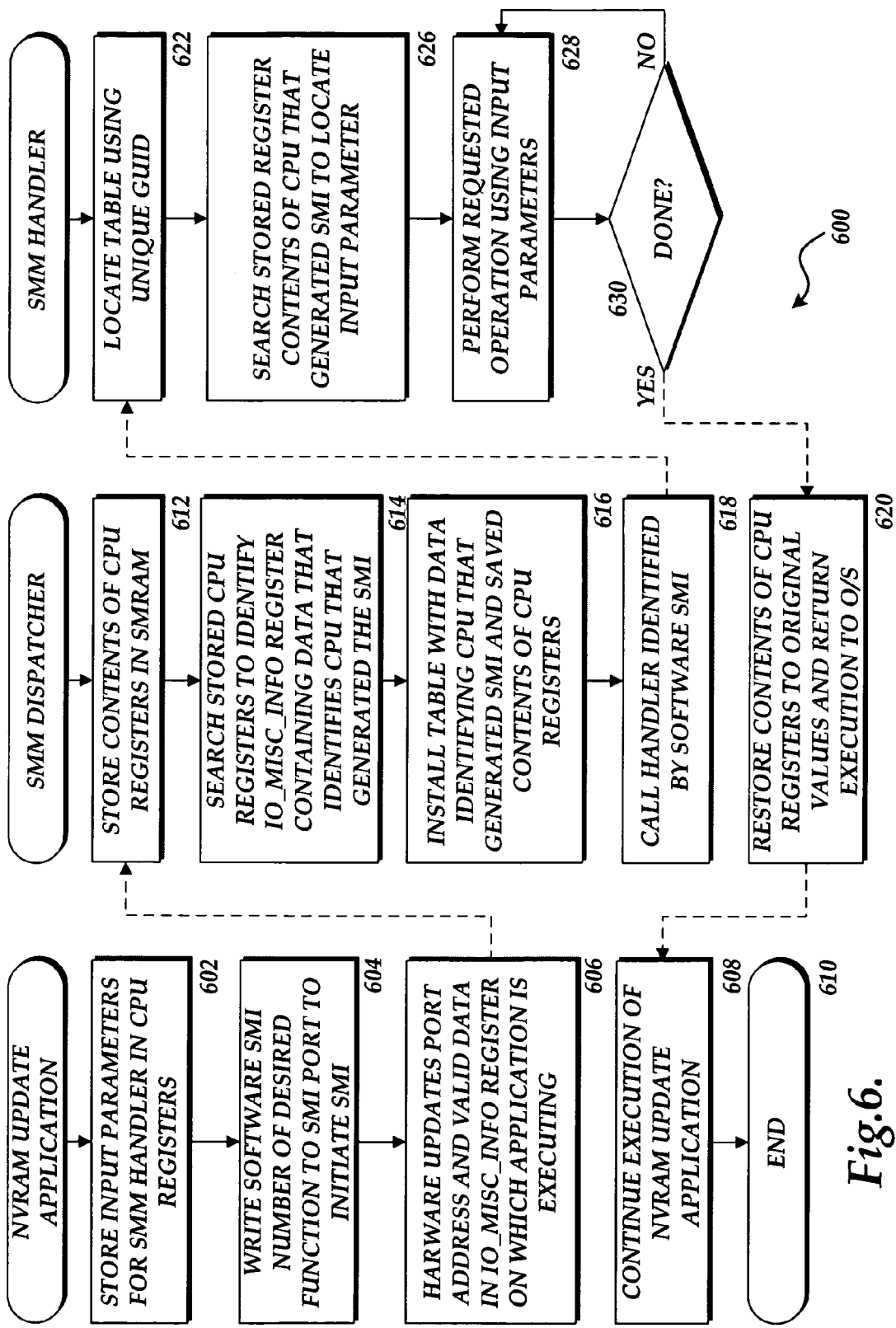
FIG. 6 is a flow diagram showing an illustrative process for exchanging data between an application program and a computer firmware according to one embodiment.

Referring now to FIG. 6, an illustrative routine 600 will be described in detail for updating the contents of the NVRAM 137, which includes the exchange of data between an application program and a firmware program in a multi-processor computer system. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the application program 500 stores the input parameter for the SMM handler in the register 400E. The routine 600 then continues to operation 604, where the application program 500 writes the SMM handler function identifier of the desired SMM handler to the SMI port 502. This instruction causes a software SMI to be generated. From operation 604, the routine 600 continues to operation 606, where the port address and valid data are stored in the register 400F by the hardware of the computer 100, as described above.

The SMM dispatcher 454 begins processing the software SMI at operation 612. At this operation the SMM dispatcher 454 saves the contents of the registers 400A-400D of each of the processors 102A-102D in the computer system 100. The routine 600 then continues to operation 614, where the SMM dispatcher 454 searches the saved register contents to locate the data that identifies the CPU that initiated the software SMI. Once this data has been located, the routine 600 continues to operation 616, where the SMM dispatcher installs the table 513 that includes the data 514 that identifies the CPU that initiated the software SMI and the saved registers 511. At operation 618, the SMM dispatcher 454 calls the specified SMM handler 456. At operation 622, the called SMM handler 456 begins handling the software SMI.

In particular, at operation 622, the SMM handler called by the SMM dispatcher 456 locates the table 513 using the GUID 512. Once the table 513 has been located, the routine 600 continues to operation 626, where the SMM handler searches the saved registers 511 of the processor that generated the SMI to locate the input parameter. Once the SMM handler has located the input parameter, it performs the requested function at operation 628. For instance, the SMM handler may read or write the NVRAM 137 using data stored in the memory location referenced by the input parameter. Once the operation has been completed, the routine 600 branches from operation 628 back to operation 620.

At operation 620, the SMM dispatcher 454 restores the state of the CPUs to their original state prior to generation of the software SMI. The routine 600 then branches back to operation 608, where the application program 500 continues executing where it left off prior to the software SMI. As discussed above, this process may be performed multiple times by the application program 500 to perform the desired operation on the NVRAM 137. From operation 608, the routine 600 continues to operation 610, where it ends.

Based on the foregoing, it should be appreciated that embodiments described herein provide methods, systems, apparatuses, and computer-readable media for exchanging data between an application program and a firmware program in a multi-processor computing system. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for exchanging data between a runtime environment application program and a firmware program executing in a system management mode (SMM) on a computer system having two or more processors, the method comprising:
   - storing an input parameter for the firmware program in a register of a first one of the processors;
   - generating a software system management interrupt (SMI) by way of the first processor;
   - in response to the generation of the software SMI, saving the contents of the registers of all of the processors;
   - identifying the processor that generated the SMI from within a system management mode;
   - installing a table in the SMM that includes data identifying the processor that generated the SMI, the saved contents of the registers of all of the processors, and a globally unique identifier (GUID);
   - locating the table using the GUID;
   - identifying the registers of the processor that generated the SMI from the saved contents of the registers of all of the processors included in the table;
   - searching the registers of the processor that generated the SMI included in the table to locate and retrieve the input parameter; and
   - retrieving the input parameter from the saved contents of the registers of the processor that generated the software SMI interrupt included in the table.

2. The method of claim 1, wherein identifying the processor that generated the SMI from within a system management mode comprises searching the saved contents of the registers to locate saved data that identifies the first processor as having generated a software SMI.

3. The method of claim 1, wherein generating a software SMI by way of the first processor comprises writing a function identifier corresponding to the firmware program to a SMI port.

4. The method of claim 1, wherein the firmware program is further operative to utilize the input parameter to update a portion of a non-volatile memory device in the computer system.

5. A computer-readable storage medium having computer-executable instructions stored thereon which, when executed by a computer, cause the computer to perform the method of claim 1.

6. A computer-controlled apparatus capable of performing the method of claim 1.

7. A method for exchanging data between a runtime environment application program and a firmware program executing in a system management mode (SMM) on a computer system having two or more processors, the method comprising:
   - storing, by way of the application program, an input parameter for the firmware program in a register of a first of the two or more processors;
   - initiating an SMI by writing to a system management interrupt (SMI) port, by way of the application program, a function identifier that identifies the firmware program as a handler of the SMI;
   - in response to the initiation of the SMI, executing a SMM dispatcher program in the SMM to save the contents of one or more registers for each of the processors;
   - identifying, by way of the SMM dispatcher program, the processor that generated the SMI by searching the saved contents of the registers for the data identifying the first processor as generating the SMI;
   - providing, by way of the SMM dispatcher program, a table that includes the saved contents of the registers for each of the processors, data identifying the first processor as generating the SMI, and a GUID; and
   - searching the table, by way of a SMM handler program executing within the SMM, to obtain the input parameter.

8. The method of claim 7, wherein the SMM handler program is further operative to utilize the input parameter to update a portion of a non-volatile memory device of the computer system.

9. The method of claim 7, further comprising restoring, by way of the SMM dispatcher, the saved contents of the processor registers when the SMM handler has completed its operations.

10. The method of claim 9, further comprising continuing execution of the application program once the saved contents of the processor registers have been restored.

11. A computer-readable storage medium having computer-executable instructions stored thereon which, when executed by a computer, cause the computer to perform the method of claim 7.

12. A computer-controlled apparatus capable of performing the method of claim 7.

13. A method for exchanging data between a runtime environment application program and a firmware program executing in a system management mode (SMM) on a computer system having two or more processors, the method comprising:
   - storing an input parameter for the firmware program in a register of a first one of the processors;
   - specifying the firmware program as a handler for a system management interrupt (SMI) and generating a SMI by way of the first processor;
   - in response to the SMI, identifying from within a firmware environment the processor that generated the SMI by searching saved data containing the stored contents of one or more registers of the processors for the identifying data;

in response to locating the identifying data, installing a table in the SMM comprising data identifying the processor that generated the SMI, the contents of the registers of the processors, and a globally unique identifier (GUID);

calling the firmware program;

locating the table utilizing the GUID;

searching the contents of the registers of the processors included in the table for the input parameter; and utilizing the input parameter to perform a function by way of the firmware program.

14. The method of claim 13, wherein the firmware program is operative to utilize the input parameter to update a portion of a non-volatile memory device of the computer system.

15. The method of claim 13, wherein the identifying, installing, and calling operations are performed by a SMM dispatcher.

16. The method of claim 13, wherein the firmware program is a SMM handler.

17. A computer-readable storage medium having computer-executable instructions stored thereon which, when executed by a computer, cause the computer to perform the method of claim 13.

18. A computer-controlled apparatus capable of performing the method of claim 13.

* * * * *